Figure 2:
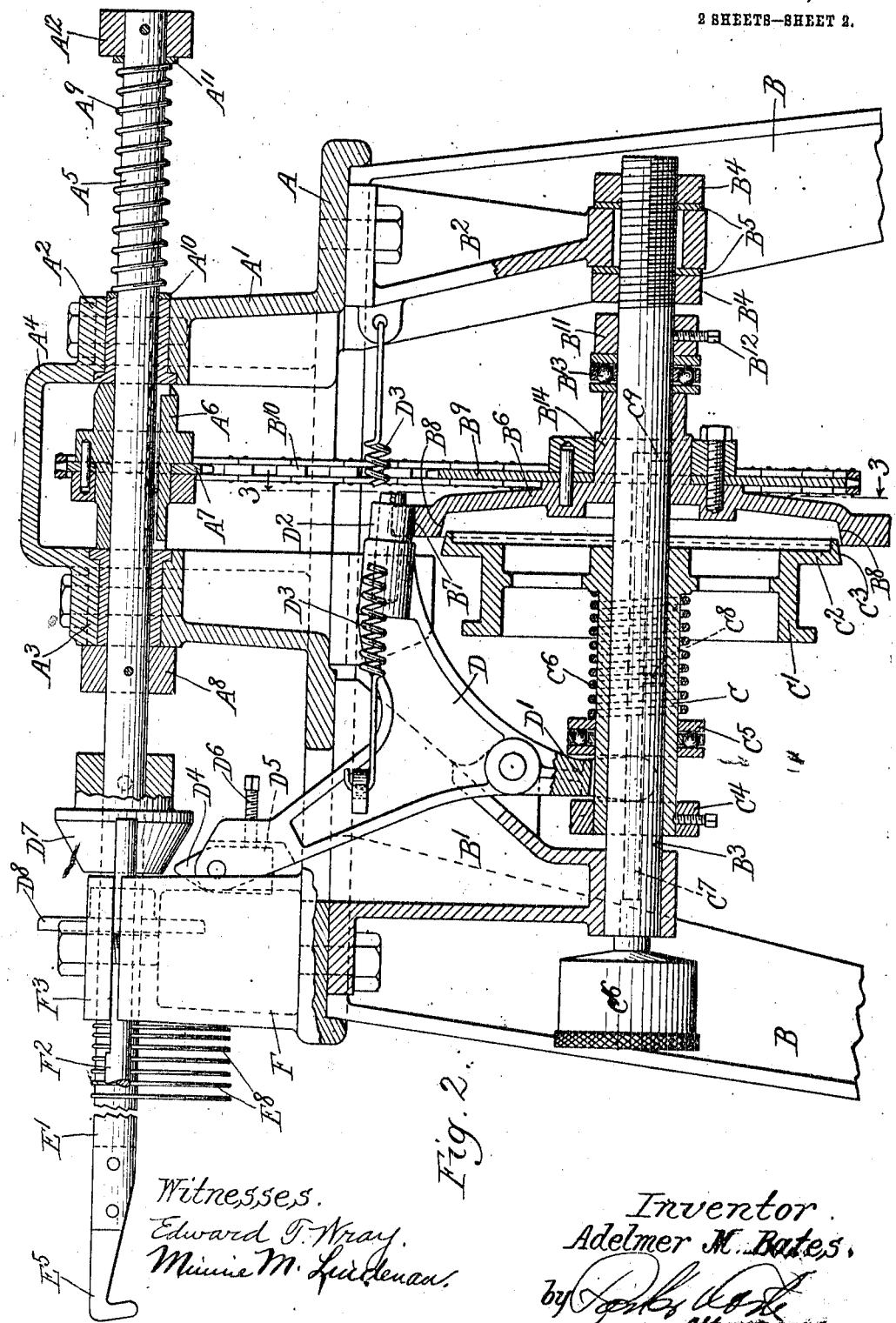

A. M. BATES.
APPARATUS FOR APPLYING CLOSURES TO PACKAGES.
APPLICATION FILED OCT. 12, 1912.
1,099,275. Patented June 9, 1914.
2 SHEETS—SHEET 1.
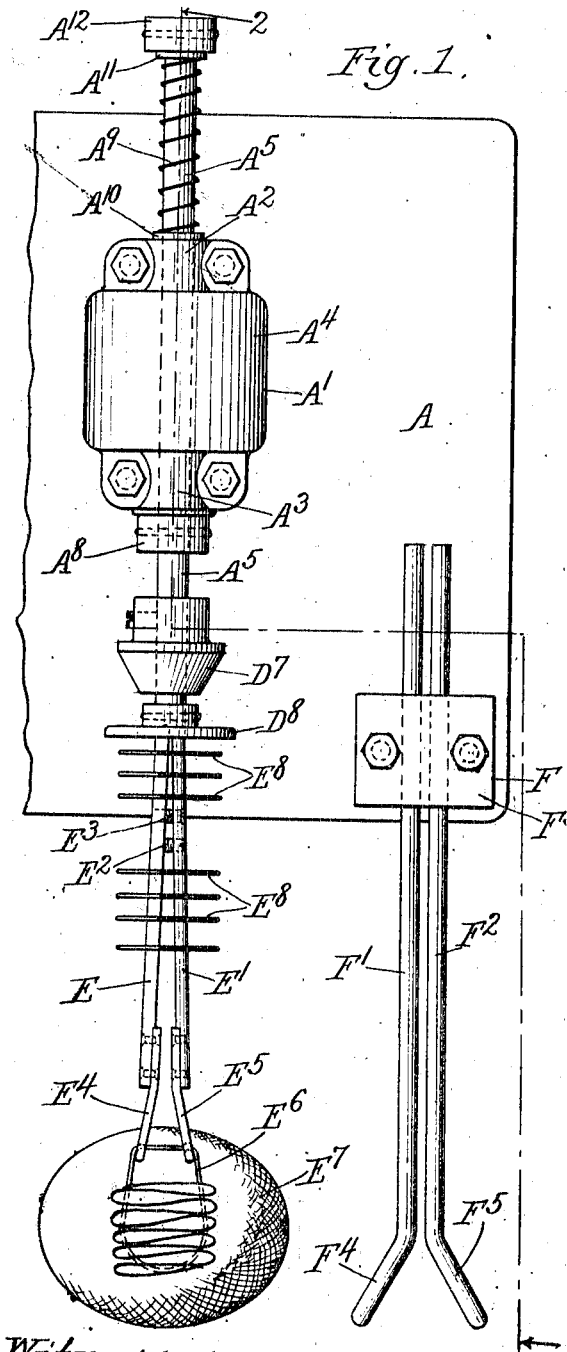
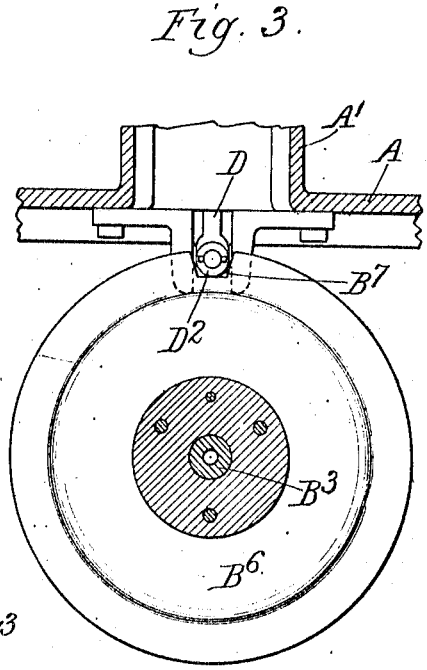
Witnesses:
Edward T. Wray
Minnie M. Lindenau
Inventor:
Adelmer M. Bates
by Parker & …
Attorneys.

A. M. BATES.
APPARATUS FOR APPLYING CLOSURES TO PACKAGES.
APPLICATION FILED OCT. 12, 1912.

1,099,275.

Patented June 9, 1914.
2 SHEETS—SHEET 2.

Witnesses.
Edward T. Wray.
Minnie M. Lindenau.

Inventor.
Adelmer M. Bates,
by
Attorneys

UNITED STATES PATENT OFFICE.

ADELMER MARCUS BATES, OF CHICAGO, ILLINOIS, ASSIGNOR TO BATES VALVE BAG COMPANY, OF CHICAGO, ILLINOIS, A CORPORATION OF WEST VIRGINIA.

APPARATUS FOR APPLYING CLOSURES TO PACKAGES.

1,099,275.  Specification of Letters Patent.  Patented June 9, 1914.

Application filed October 12, 1912. Serial No. 725,512.

*To all whom it may concern:*

Be it known that I, ADELMER M. BATES, a citizen of the United States, residing at Chicago, in the county of Cook and State of Illinois, have invented a certain new and useful Improvement in Apparatuses for Applying Closures to Packages, of which the following is a specification.

My invention relates to an apparatus for applying closures to packages and is illustrated diagrammatically in one form in the accompanying drawings, wherein—

Figure 1 is a plan view; Fig. 2, a section along the line 2—2 of Fig. 1; Fig. 3, a section along the line 3—3 of Fig. 2 on a reduced scale.

Like parts are indicated by like letters throughout the several figures.

A is a table from which projects upwardly the housing $A^1$.

$A^2$ $A^3$ are bearings mounted on the housing $A^1$.

$A^4$ is a cap to close the upper open end of the housing $A^1$ and to complete the bearings $A^2$ $A^3$.

$A^5$ is a shaft rotatably and slidably mounted in the bearings $A^2$ $A^3$.

$A^6$ is a sleeve slidable on the shaft $A^5$ located within the housing $A^1$, interposed between the bearings $A^2$ $A^3$ and splined to the shaft $A^5$.

$A^7$ is a driving sprocket rigidly mounted on the sleeve $A^6$.

$A^8$ is a collar rigidly mounted on the shaft $A^5$ and adapted by its contact with the bearing $A^3$ to limit the movement of the shaft toward the rear of the machine.

$A^9$ is a compression spring surrounding the shaft $A^5$ interposed between the washers $A^{10}$ $A^{11}$ which bear respectively against one end of the bearing $A^2$ and the collar $A^{12}$ on the end of the shaft $A^5$. The spring $A^9$ has for its function to yieldingly hold the shaft in its rearmost position with the collar $A^8$ against the bearing $A^3$.

B is a supporting frame for the table A.

$B^1$ $B^2$ are brackets downwardly depending from the table A, and carrying the shaft $B^3$.

$B^4$ $B^5$ are nuts and washers respectively mounted on the shaft $B^3$ and engaging the bracket $B^2$ to hold the shaft in position. The bracket is cored out larger than the shaft so that the shaft may be easily and conveniently centered.

$B^6$ is a clutch disk rotatably mounted on the shaft $B^3$ having a single slot $B^7$ in its periphery.

$B^8$ is the conical clutch surface of said disk.

$B^9$ is a sprocket rigidly attached to the clutch disk $B^6$.

$B^{10}$ is a sprocket chain connecting the sprockets $A^7$ and $B^9$. The two sprockets $A^7$ and $B^9$ are so proportioned that for every single revolution of the sprocket $B^9$ the sprocket $A^7$ makes three revolutions.

$B^{11}$ is a collar rigidly attached to the shaft $B^3$ by the set screw $B^{12}$.

$B^{13}$ is a ball thrust bearing mounted on the shaft $B^3$ and interposed between the collar $B^{11}$ and the hub $B^{14}$ on which are mounted the clutch disk $B^6$ and sprocket $B^9$.

C is a sleeve rotatably and slidably mounted on the shaft $B^3$.

$C^1$ is a pulley rigidly mounted on the sleeve C and adapted to be driven from any suitable source of power by a belt not shown.

$C^2$ is a clutch member having a conical surface $C^3$ adapted to engage the conical surface $B^8$ in the clutch member or disk $B^6$.

$C^4$ is a collar rigidly attached to the sleeve C.

$C^5$ is a ball thrust bearing rotatable on the sleeve C.

$C^6$ is a compression spring surrounding the sleeve C interposed between the thrust bearing $C^5$ and the pulley $C^1$.

$C^{10}$ is a grease cup communicating by means of the passage $C^7$ and discharges $C^8$ $C^9$ with the outside of the shaft $B^3$ to lubricate the bearing surface between the shaft and the sleeve C and hub $B^{14}$.

D is an actuating lever pivoted on the bracket $B^1$ and having a forked clutch operating finger $D^1$ straddling the sleeve C and interposed between the collar $C^4$ and the bearing $C^5$.

$D^2$ is a cam roller mounted on the lever D and adapted to ride upon the cylindrical surface of the disk $B^6$ and to engage in the slot $B^7$.

$D^3$ is a tension spring interposed between the controlling member D and the bracket $B^2$ to yieldingly press the roller $D^2$ inwardly against the disk $B^6$ and to cause it to enter the slot $B^7$ when they are in opposition thus rotating the forked portion $D^1$ to withdraw the clutch.

D⁴ is an actuating latch pivotally mounted on the member D and projecting upwardly therefrom.

D⁵ is a counterbalance weight to yieldingly hold the latch D⁴ in upright position.

D⁶ is an adjusting screw to limit the rotation of the latch D⁴ in the member D.

D⁷ is a conical cam member rigidly mounted on the shaft A⁵ in opposition to the latch D⁴ and adapted to be moved forwardly to engage the latch and press it against the screw D⁶ and rotate the member D to engage the clutch and lift the roller D² out of the slot and permit it to ride on the disk B⁶.

D⁸ is a guard disk located on the shaft A⁵ in front of the cam member D⁷.

E E¹ are spring fingers projecting forwardly from the shaft or spindle A⁵ and held apart by the stud E² and held together by the screw E³.

E⁴ E⁵ are hooks projecting outwardly from the ends of the fingers E E¹ to engage a wire bag tie E⁶ about the neck of the bag E⁷.

E⁸ E⁸ are bag tie rings which are carried on the fingers E E¹ adjacent the guard D⁸ until needed.

F is a bracket projecting upwardly from the table A carrying slidably and adjustably mounted therein the two parallel spring rods F¹ F².

F³ is a cap bolted to the bracket F to hold the rods F¹ F² in position.

F⁴ F⁵ are outwardly bent portions of the fingers F¹ F² to permit the easy insertion of the bag.

The use and operation of my invention are as follows:—With the driving pulley driven from any suitable source of power by a belt as above indicated the operator takes his place before the machine and inserts the neck of a bag between the two spring-crimping fingers. He then, holding one hand at the outer end of the spring crimping fingers, brings the bag forward with the other, catching it in his hand as it leaves the crimping fingers. The result of this is to crimp the neck of the bag as indicated in Fig. 1. He then takes one of the bag tie rings on the twisting fingers, pulls it forward, drops it over the neck of the bag and catches it in the hook. He then, holding the bag firmly with his two hands one above and the other below the bag tie, pulls forward away from the machine. This straightens out the bag tie somewhat as indicated in Fig. 1 compressing the tension spring and causes the conical cam member to come in contact with the latch, bear it down and rotate the actuating lever. This rotation of the actuating lever throws the clutch into the operating position and permits the driven member to rotate because the roller which normally occupies the slot therein has meanwhile been withdrawn. The roller then rotates on the outer periphery of the disk while the disk makes a single revolution. This single revolution of the clutch disk causes the twisting spindle to make three revolutions and twist the bag tie firmly about the bag. The cam roller drops back into the slot at the end of the revolution and the clutch is disengaged. The operator then can withdraw the bag.

The clutch it will be noted is compressed into the operating position by a spring. The function of this spring is to provide for irregularities or inequalities in size, shape or arrangement of parts so that there is no possibility of binding and so that they need not be made with any great degree of accuracy.

It will be noted that in Fig. 1 the two parts of the bag tie are spaced very broadly one from the other and the operator in order to permit the twist at all must, when he draws back on the bag to throw the clutch, bring his thumb and one finger around the neck of the bag and press the bag tie together thus locating the point at which the twist starts. By this movement he of course locates it adjacent the bag and the twist will then progress away from the bag. Thus there is no danger of the bag being too tightly constricted and there is no danger of any breakage of the bag tie itself such as so frequently occurs when the twist works both ways.

I claim:

1. Means for twisting a wire tie about a package, comprising a slidably mounted twisting mandrel having hooks at its end, constantly moving driving means, and means responsive to the longitudinal movement of the mandrel for connecting it with the driving means to rotate it.

2. Means for twisting a wire tie about a package, comprising a slidably mounted twisting mandrel, constantly moving driving means and means responsive to the longitudinal movement of the mandrel for connecting it with the driving means to rotate it, and automatic means for disconnecting the mandrel and the driving means when the mandrel has made a predetermined number of revolutions.

3. Means for twisting a wire tie about a package, comprising a slidably mounted twisting mandrel, constantly moving driving means and means responsive to the longitudinal movement of the mandrel for connecting it with the driving means to rotate it, and automatic means for disconnecting the mandrel and the driving means when the mandrel has made a predetermined number of revolutions, said means comprising a clutch disk, a driving connection between said disk and said mandrel, a cam surface on the periphery of said clutch disk, a clutch member adapted to engage said clutch disk and adapted to be in constant rotation, a cam member on the mandrel, a lever projecting into the path of the cam, said lever being in engagement with the clutch, and a cam roller on said lever in engagement with the cam on the clutch disk.

4. Means for twisting wire rings about a package to form a wire tie, comprising a rotatable twisting mandrel, spring arms projecting outwardly from one end of said mandrel in a line substantially parallel with the axis of the mandrel, ring engaging hooks on the ends of said arms, and means for adjusting the spread of said arms.

5. Means for twisting a wire tie about a package comprising a slidably mounted twisting mandrel having hooks at its end, said mandrel being mounted for rotation, a driving means, and means responsive to the longitudinal movement of the mandrel for throwing said driving means into operation to rotate the mandrel.

In testimony whereof, I affix my signature in the presence of two witnesses this 5th day of October 1912.

ADELMER MARCUS BATES.

Witnesses:
 LULU JORDAN,
 MINNIE SUNDFAR.